(12) United States Patent
Ben Horin

(10) Patent No.: US 11,331,834 B2
(45) Date of Patent: May 17, 2022

(54) INJECTION MOULDING SYSTEM AND METHOD

(71) Applicant: ARKAL AUTOMOTIVE C.S. LTD., Lower Galilee (IL)

(72) Inventor: Amitai Ben Horin, Rakefet (IL)

(73) Assignee: ARKAL AUTOMOTIVE C.S. LTD., Lower Galilee (IL)

( * ) Notice: Subject to any disclaimer, the term of this patent is extended or adjusted under 35 U.S.C. 154(b) by 0 days.

(21) Appl. No.: 17/052,808

(22) PCT Filed: Apr. 3, 2019

(86) PCT No.: PCT/IB2019/052736
§ 371 (c)(1),
(2) Date: Nov. 4, 2020

(87) PCT Pub. No.: WO2019/224618
PCT Pub. Date: Nov. 28, 2019

(65) Prior Publication Data
US 2021/0245409 A1    Aug. 12, 2021

Related U.S. Application Data

(60) Provisional application No. 62/674,245, filed on May 21, 2018.

(51) Int. Cl.
*B29C 45/00* (2006.01)
*B29C 45/07* (2006.01)
*B29C 45/10* (2006.01)
*B29C 45/14* (2006.01)

(52) U.S. Cl.
CPC ............ *B29C 45/076* (2013.01); *B29C 45/10* (2013.01); *B29C 45/14467* (2013.01); *B29C 45/14614* (2013.01)

(58) Field of Classification Search
CPC ....... B29C 45/07; B29C 45/076; B29C 45/14; B29C 45/17; B29C 45/1742; B29C 2045/1784
See application file for complete search history.

(56) References Cited

U.S. PATENT DOCUMENTS

| | | | |
|---|---|---|---|
| 5,192,387 A | 3/1993 | Buckley | |
| 6,808,378 B2 | 10/2004 | Wirth et al. | |
| 7,875,224 B2* | 1/2011 | Gruber | B29C 43/04 |
| | | | 264/250 |
| 9,849,637 B2* | 12/2017 | Pajel | B29C 45/14336 |
| 2014/0077410 A1 | 3/2014 | Takatsugi et al. | |
| 2015/0224688 A1 | 8/2015 | Malke et al. | |

(Continued)

FOREIGN PATENT DOCUMENTS

| CN | 104669512 | 6/2015 |
|---|---|---|
| DE | 102005014802 | 12/2006 |

(Continued)

*Primary Examiner* — Joseph S Del Sole
*Assistant Examiner* — Thu Khanh T Nguyen
(74) *Attorney, Agent, or Firm* — The Law Office of Joseph L. Felber

(57) ABSTRACT

An injection molding module for performing a series of injection molding actions, includes a robotic system. The molding module in addition includes a series of anchoring members for fixing at least a portion of the robotic system at each location where an injection molding action takes place.

19 Claims, 6 Drawing Sheets

(56) References Cited

U.S. PATENT DOCUMENTS

| | | | |
|---|---|---|---|
| 2016/0001469 A1* | 1/2016 | Bacchereti | B29C 41/34 |
| | | | 264/40.1 |
| 2016/0107396 A1* | 4/2016 | Berman | B29C 69/001 |
| | | | 29/428 |
| 2017/0151731 A1* | 6/2017 | Ho Yew Chi | B33Y 50/00 |

FOREIGN PATENT DOCUMENTS

| | | |
|---|---|---|
| JP | H07112445 | 5/1995 |
| JP | H08336847 | 12/1996 |
| JP | 2004188963 | 7/2004 |
| JP | 2005138380 | 6/2005 |
| JP | 2010069776 | 4/2010 |
| JP | 2012192543 | 10/2012 |

\* cited by examiner

INJECTION MOULDING SYSTEM AND METHOD

TECHNICAL FIELD

Embodiments of the invention relate to an injection molding system and/or method, in particular such being arranged to carry out a series of injection thermoplastic molding actions, preferably automatically.

BACKGROUND

Molding systems capable of carrying out a series of thermoplastic injection molding actions may make use of robotic systems.

CN104669512 for example describes plasticization and injection being performed using a mobile injection unit. After injection molding is performed, mold parts into which the molding was made are opened, and a molded product is demolded.

SUMMARY

The following embodiments and aspects thereof are described and illustrated in conjunction with systems, tools and methods which are meant to be exemplary and illustrative, not limiting in scope.

Embodiments of the present invention may be defined as generally relating to thermoplastic robotic injection molding, preferably aimed at providing relative high pressures during molding on relative small details such as connecting/coupling elements, which are over-molded over relative large structures/substrates and/or large parts made from a variety of materials.

An aspect applicable to at least certain embodiments, may be defined as provision of such thermoplastic robotic injection molding, by injection molding units of relative small size and/or light in weight, that consequently can be relatively easily manipulated and fitted to robotic systems (e.g. articulated robotic systems)—as opposed to conventional injection molding machines typically required for performing comparable molding actions.

In at least certain embodiments, molds may be structured in a way that can enable segments of the mold to move/slide one in relation to the other and be clamp together to form a mold suitable for injection molding, and thereafter injection may be executed to form required features on a substrate located in the mold. Thereafter, segments may be urged to slide backwards for part demolding. Provision of such movement/sliding between mold segments, in at least certain embodiments may be facilitated by a generally "c" shaped clamp coupled to a least one of the mold segments.

Thermoplastic resins possibly used in various embodiments of the invention may include: PA, PP, PS, ABS (etc.). Such molding in some cases may require pressures 'P' of between about 300 and about 800 ATM in cavity pressure, where 'P' (pressure) times 'S' (projection surface) is equal to required clamp force 'F' needed for holding mold segments together during holding.

In one example, a mold may be arranged to include a projection surface 'S' of about 40 cm$^2$, and injecting therein Polyamide to form a part may require a clamp force of about 20 Ton in order to hold segments of the mold together during molding.

Thus, at least certain injection module embodiments of the invention may be characterized as suitable for carrying relative low weights and molding of parts that include relative small projection surfaces 'S' during molding.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
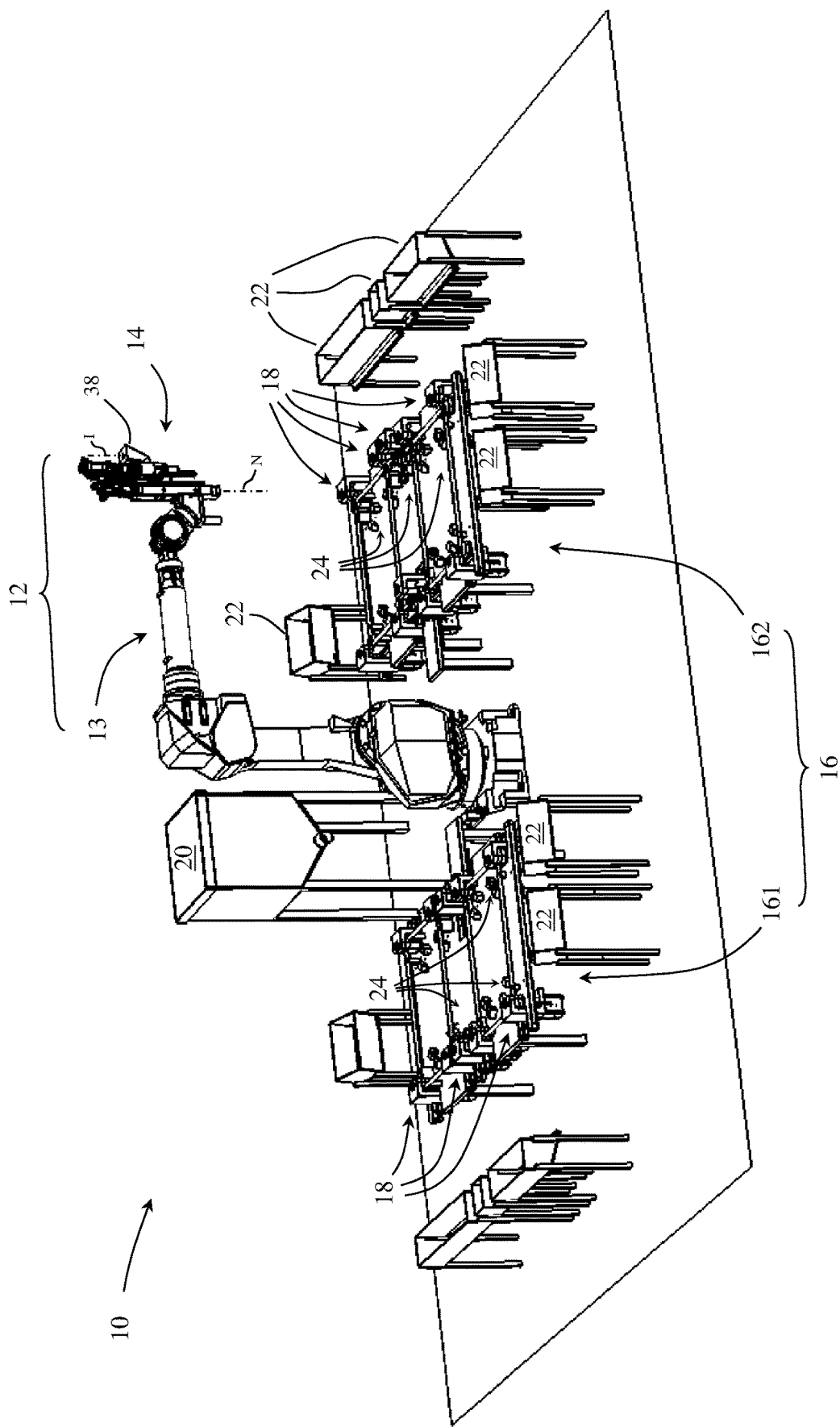
FIG. 1 schematically shows an injection molding module in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 schematically illustrating an embodiment of an injection molding module 10 of the invention. Injection molding module 10 includes a robotic system 12. Robotic system 12 includes an industrial robot 13, preferably an articulated industrial robot, and an injection molding unit 14 that is mounted to robot 13, here to the last manipulator link of the shown articulated robot. In a non-binding example, robot 13 may be of a type generally similar to that offered by FANUC robotics, KUKA robotics, ABB robotics (or the like). Injection molding unit 14, in a non-binding example, may be an injection unit, such as that offered by Plasdan, Automation & Add-On Systems, the E-Multi of Mold-Masters Limited (or the like).

Injection molding module 10 in the illustrated example, is seen including work station(s) 16, here two such possible stations 161, 162. Work station 161 exemplifies a loaded station 161 ready for injection molding and optional work station 162 exemplifies an unloaded station undergoing preparation for injection molding.

Work station 162 may undergo loading during a time span when work station 161 is already in a loaded state and/or undergoes an injection molding process by robotic system 12. Injection molding module 10 may include in addition a material silo 20, and possible containers 22 located at a vicinity of each station and associated therewith. The containers may be for storing structural member possibly inserted into molds, accessories required for molding (and the like). Each work station in addition includes one or more molding sites 18.

Injection molding modules of least certain embodiments of the invention may be embodied to include one or as here illustrated two and in some cases, more than two work stations. Module embodiments including several work stations may exhibit improved overall injection molding efficiency, since while one work station (e.g. 161) undergoes an injection molding procedure by robotic system 12, other work stations (e.g. 162) may undergo loading in order to prepare them for a subsequent injection molding procedure by same robotic system 12 e.g. after completion of the injection procedure taking place in a current active work station 161.

Attention is drawn to FIGS. 2A to 2D for closer views of a portion of injection molding module 10 during various stages on an injection molding procedure. Here injection module 10 is seen including one possible embodiment of an injection site 18, which includes an anchoring member 24 here embodied by one or more anchoring rails 241 that are fixed to a base 1600 of the work station. Base 1600 may be held lifted from a ground floor by legs to form a possible table-like work station formation.

Injection site 18 in addition includes a mold 26 here including first and second mold segments 261, 262. First mold segment 261 may be fixed to base 1600, while second mold segment 262 may be fixed to a movable fixture 28. Fixture 28 may be arranged to move second mold segment 262 to form closed and open states of mold 26. In the open state of mold 26 (illustrated e.g. in FIG. 2A), second mold segment may be set aside from above first mold segment 261 to thereby expose cavities formed within mold segment 261 here from above.

Figure 2A:
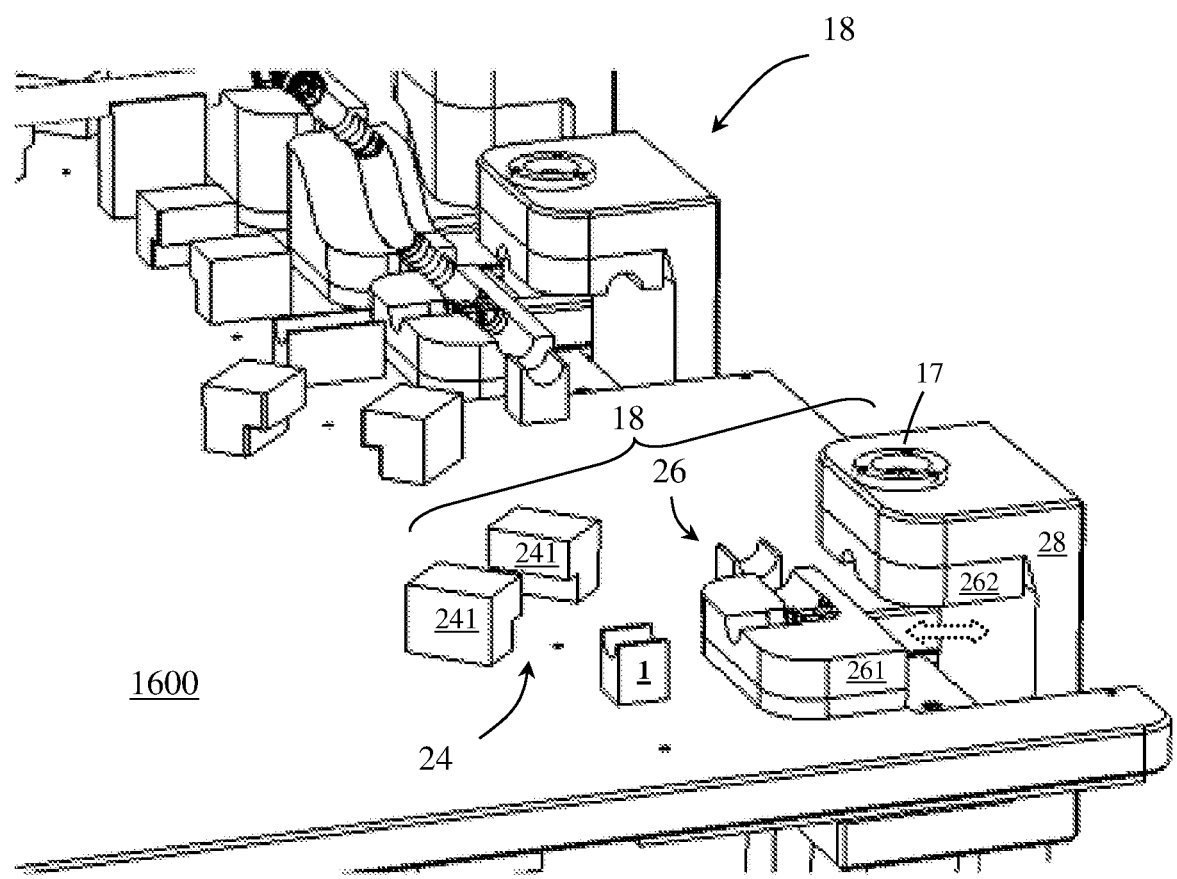
FIGS. 2A to 2D schematically show a portion of the injection molding module of FIG. 1 during various injection molding stages/actions according to an embodiments of the present invention.
Figure 2B:
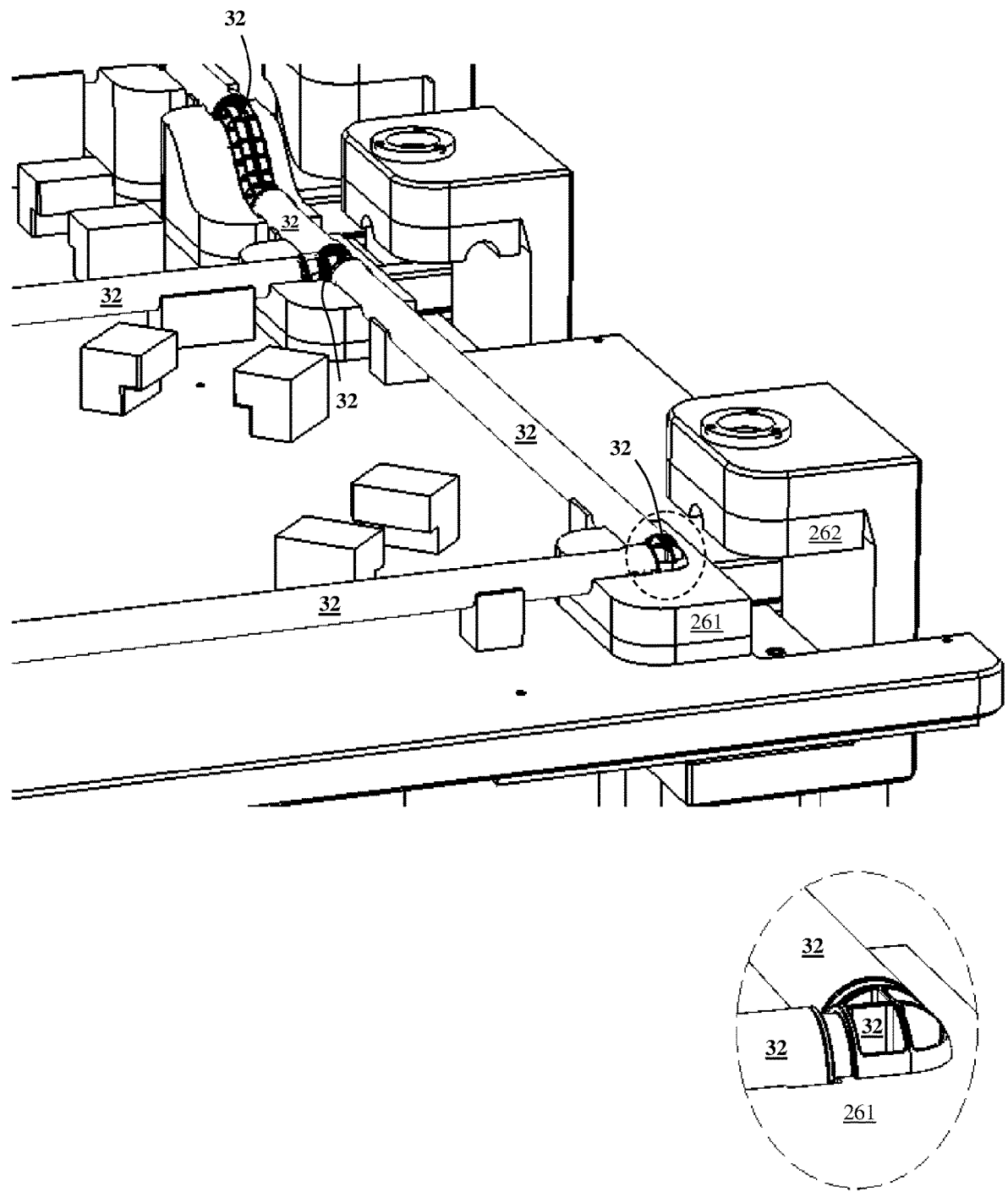
Figure 2C:
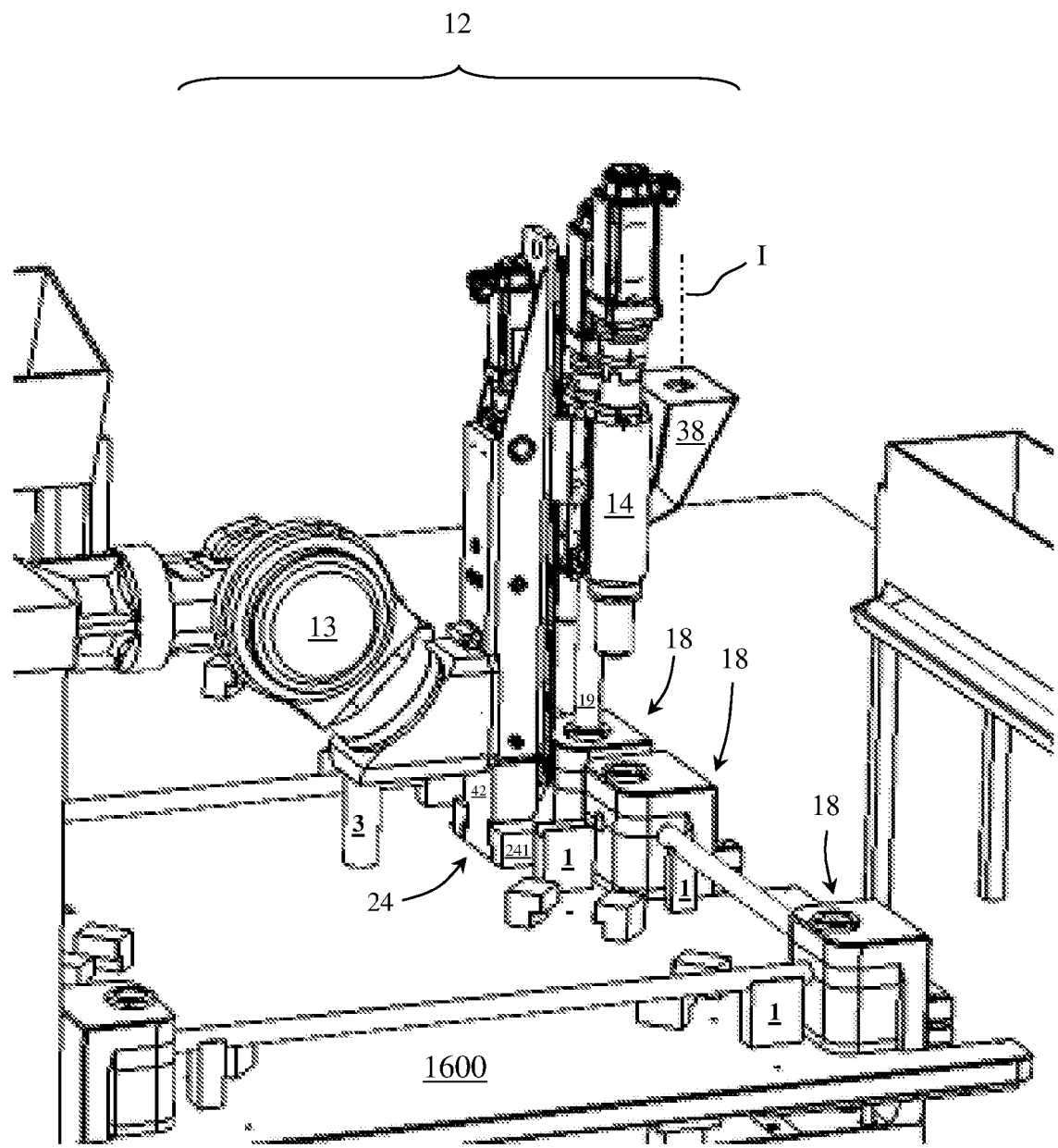

In the closed state of mold 26 (as illustrated in FIG. 2C), second mold segment 262 may be located above first mold segment 261, and a locking piston may be triggered to urge engagement between the second and first mold segments 262, 261 suitable for performing injection molding within such mold. In the closed state, mold 26 may be ready for injection molding. Mold 26 includes a sprue 17, here formed in second mold segment 262, through which molten material can be introduced into mold 26 during an injection molding procedure.

Injection site 18 in the view seen in FIG. 2A is in an arrangement suitable for loading pre-formed structural members into mold 26 to act as substrates to be at least partially covered by an over-mold. FIG. 2B illustrates a stage possible obtained during loading of a work station, where structural members 32 have been placed projecting into and/or fully placed within cavities of molds 26 of the work station. Possible supports 1 fixed to base 1600 may be placed adjacent each mold 26 to support the structural members, when loaded/placed in the molds. Such structural members may be stored in the containers 22 and in some embodiments, may be manually loaded into/onto the molds 26. FIG. 2C provides a view of a work station with several injection sites 18 all including molds 26 in closed states. Thus, the work station seen in this view may embody a loaded work station ready for injection molding.

FIG. 2C exemplifies one option of an injection molding procedure being implemented by robotic system 12. In an embodiment of the invention, robotic system 12 may be operated in accordance with a program to perform injection molding procedures/steps at injection sites 18 of a loaded work station (such as work station 161). In a first step, robotic system 12 may be manipulated to position its injection unit 14 in a mating engagement with an anchoring member 24 of an injection site 18 where injection of molten material into the mold of the site is programed to occur.

Mating of robotic system 12 with the anchoring member may be performed by configuring robotic system, here e.g. at injection unit 14, to include a coupling member 42 that is arranged to mate with anchoring member 24. The mating of robotic system 12 with anchoring member 24, in at least certain embodiments, may be aimed at fixing injection unit 14 in place (here to base 1600) during injection of pressurized molten material into a mold 26 of a loaded injection site 18. Robotic system 12 may also be arranged to include a rest 3 for stabilizing and/or providing counter support for the robotic system against base 1600 during an injection molding procedure. Such stabilizing and/or counter support provided by rest 3 may resist forces acting during injection molding, such as moment forces resulting from pressures applied by injection unit 14 during such molding procedures/actions. In a non-binding example, injection unit 14 may be arranged to perform injection molding at pressures between about 1000 and about 2500 atm, such as about 1500 atm (or the like).

Once injection molding of a given injection site has been completed, robotic system 12 may urge injection unit 14 to a successive new injection site within e.g. the loaded work station, to perform injection molding of the mold of the new site. This process may go on until injection molding actions have been performed at all injection sites e.g. of a loaded work station.

Figure 2D:
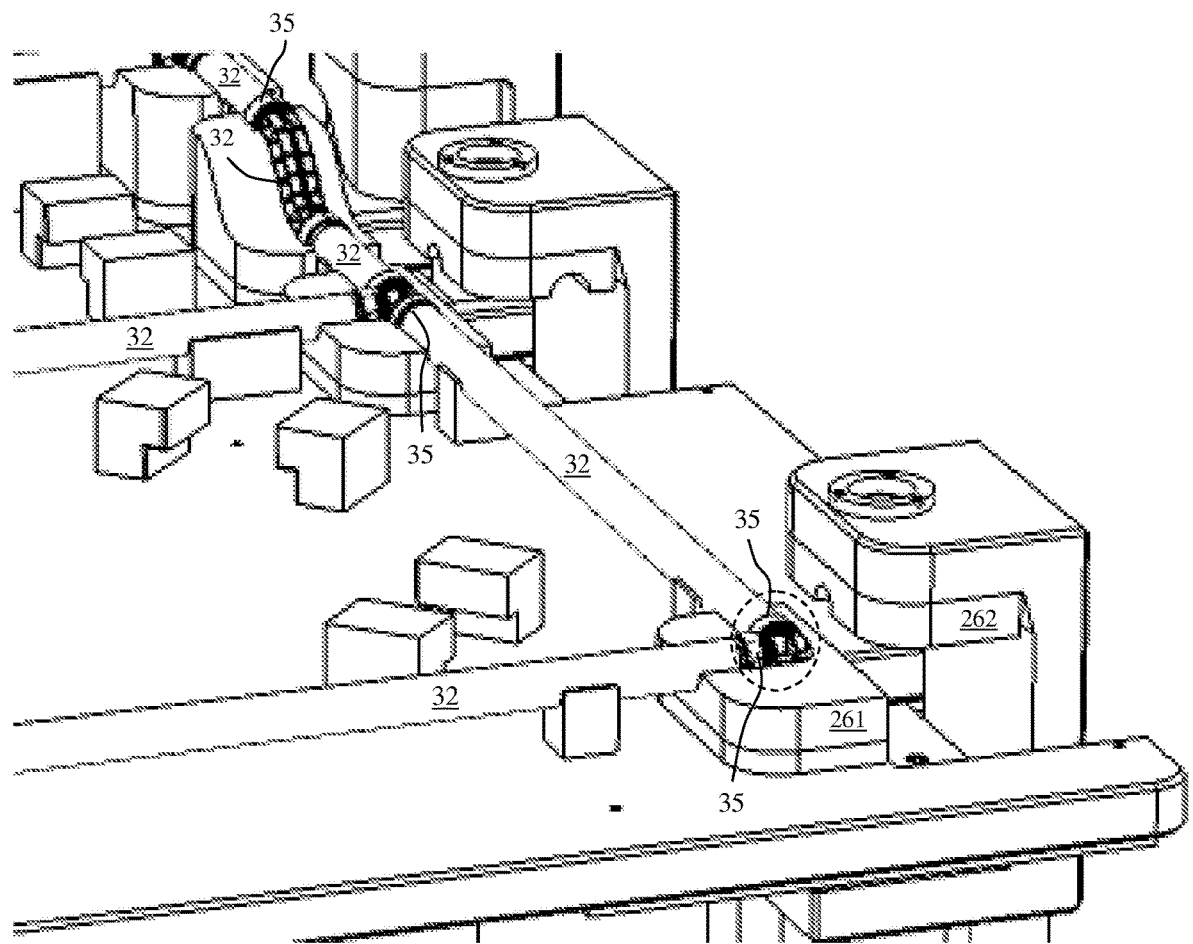
Figure 2D:
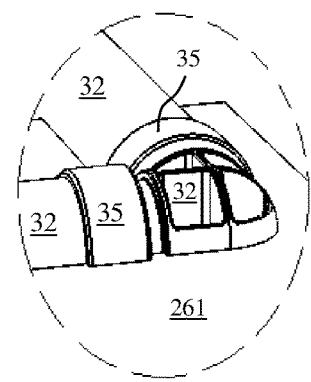
Figure 3:
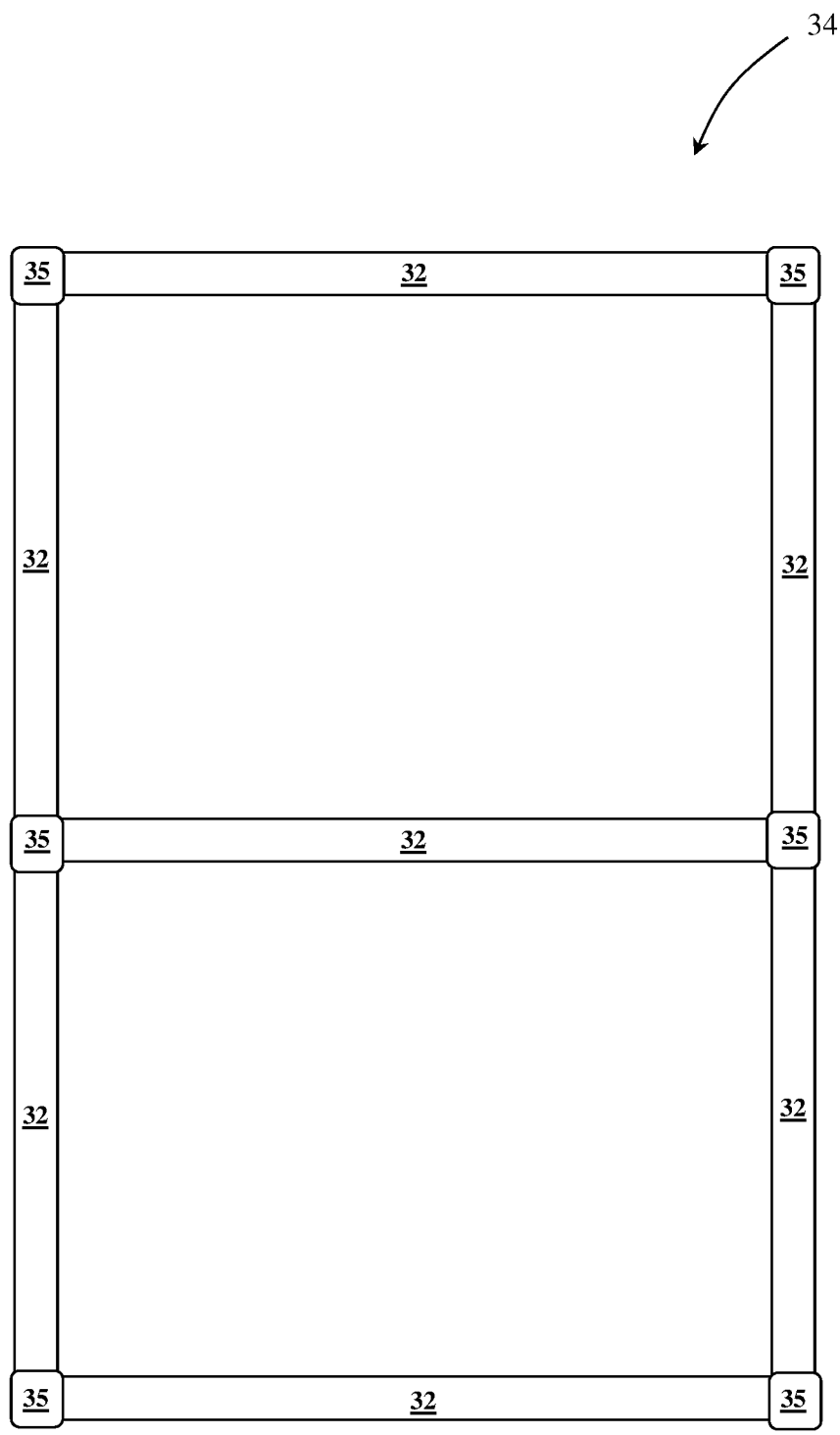
FIG. 3 schematically shows a structure possibly formed by an embodiment of an injection molding module of the invention.

As seen in FIG. 2D, the injection of molten material onto structural members 32 may result in a formation of an over-mold insert 35 here in certain examples acting as a coupling bridging between structural members to form a skeleton-like structure as seen in FIG. 2D and as schematically illustrated and indicated by numeral 34 in FIG. 3. Inserts 35 may also be formed not necessarily bridging between structural members, such as formed at an end of only one structural member and/or as branching off formations from structural members (or the like).

Structure 34 as seen in FIGS. 2D and 3 may be formed from structural members 32 over-molded at distinct locations by inserts 35 formed from material that solidified from injection molding processes performed at injection sites. Locations where the inserts 35 are formed may include intersections where two different structural members meet (or the like).

Couplings between two different structural members by an insert 35 may permit connecting structural members having different materials. For instance, while a first structural member 32 in structure 34 may be from Aluminum, an adjacent second structural member 32 connected to the first structural member by an insert 35 may be formed from plastic material.

Examples of structures 34 possibly formed by the above described robotic injection process may include vehicle crossmembers, such as a cockpit cross-car beam, a front-end carrier (or the like). Other examples of structures 34 possibly formed by the above described robotic injection process may include relative large objects, such as a door or part of a door of a storage structure such as a shed (or the like).

Injection unit 14 of robotic system 10 may include an intake member 38 for receiving material to be used in an injection molding procedure. Provision of such material may be from silo 20 and an injection molding procedure may include programing robotic system 12 to be manipulated to urge intake member 38 towards, possibly beneath, silo 20 in order to receive a dose of material. In some embodiments, intake member 38 may take form of a funnel-like member receiving material poured out of silo 20 and entering via the funnel into the injection unit, inter alia, by means of gravitational force.

Robotic system 12 may be arranged to receive molding parameters of or associated to a molding site 18 and/or mold 26—where a subsequent injection molding action is about to take place.

Such molding parameters may include information pertaining to material and/or a dose of material suitable for an injection molding action about to take place at a given injection site. For example, a mold 26 at a given injection site 18 may require a certain amount of material (e.g. defined by weight of material) to create a part (e.g. insert 35) and the dose of material provided to the injection unit may generally correspond to that amount.

Thus, a controller (not shown) of or associated with injection module 10, may be programmed to provide injection unit at intake funnel 38 with an amount of material generally corresponding to the amount of material required for forming the part at the injection site it is about to proceed towards.

Consequently, for successive injection molding actions, robotic system 12 and/or injection unit 14 may be programmed or controlled to carry different amounts of material (e.g. measured in weight) according to the injection molding process it is about to perform at the successive injection site it is programmed to process.

Further examples of molding parameters, possibly associated to a subsequent molding action about to take place, may include any one of the following: plasticizing/dosing end point (mm), Screw RPM (rev/min), Back pressure (bar), Suck back stroke (mm), Injection speed (mm/sec), V/P change over point (mm), Packing/holding pressure (bar), Packing/holding time (sec) and/or Cooling time (sec).

In certain embodiments, molding parameters such as the amount of material required for each molding action, may be stored in a memory associated with (or included in) the controller, and according to the mold/injection-site next in queue—a controller may define the amount of material to be provided at silo 20. In certain embodiments, silo 20 may be arranged to fill, possibly substantially completely fill, intake member 38, and a sensor (e.g. a level sensor) located in or adjacent intake member 38 may sense and/or signal when injection unit 14 should return to silo 20 for a material refill.

Injection unit 14 includes a nozzle 19 (see indicated in FIG. 2C) through which molten material is adapted to exit the injection unit in order to be pressurized into a mold. In the example illustrated in the figures, injection unit 14 is seen performing an injection molding action when held upright in relation to a ground face with the nozzle opening downwards and being oriented along a downward directed axis 'N'. Also seen in the figures is that intake member 38 is oriented along an axis 'I' generally parallel to the nozzle's axis 'N', to receive material along axis 'I' when the injection unit is oriented in the upright position. Both axes 'N' and 'I' are seen indicated in FIG. 1 with axis 'I' also being indicated in FIG. 2C.

It is noted however that in certain embodiments, the injection unit may be required to perform injection molding actions when not necessarily oriented in an upright orientation, such as also when held in a horizontal orientation with axis 'N' extending sideways and possibly generally parallel to a ground face. In addition, in certain injection modules, the axes 'N' and 'I' of, respectively, the nozzle and intake members—may not necessarily be parallel to each other, such as slanted or generally perpendicular to each other.

Thus, the orientation of the injection unit when receiving material via intake member may be different to the orientation of the injection unit when performing an injection molding action. As a result, injection module 10 in some cases may be programmed to pause for a certain duration of time between an instance where material is received into the injection unit via intake member 38 and the time when the injection unit can be moved to a required orientation for performing an injection molding action. Such duration of time in some cases may be defined by a so-called 'plastification time' or 'dosing time' generally defining a time span that it takes for material entering the injection unit to be ready for injection.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. An injection molding module for performing a series of injection over molding actions, the module comprising an articulated robotic system and a series of anchoring members for fixing at least a portion of the robotic system at each location where an injection molding action takes place, wherein the robotic system comprises a robot and an injection molding unit coupled to the robot, and the robot is an articulated robot and the injection molding unit is coupled to a last manipulator of the robot, wherein the fixing is by entering the at least portion of the robotic system into mating engagement with a respective one of the series of anchoring members, and wherein the at least portion of the robotic system being fixed is a portion adjacent the injection molding unit and/or the last manipulator of the robot.

2. The injection molding module of claim 1 and comprising at least one first work station comprising a plurality of injection sites where different injection molding actions are arranged to take place, and wherein each injection site comprises a mold.

3. The injection molding module of claim 2 and comprising at least one second work station comprising a plurality of injection sites where different injection molding actions are arranged to take place, and wherein the first work station is a loaded work station ready for injection molding and the second work station is an unloaded work station not yet ready for injection molding.

4. The injection molding module of claim 3, wherein the loaded work station comprises pre-formed structural members loaded into at least some of the molds.

5. The injection molding module of claim 2, wherein each mold comprises at least two segments, and wherein a first one of the mold segments is a fixed segment and a second one of the mold segments can be moved in relation to the first mold segment.

6. The injection molding module of claim 5, wherein the second mold segment can be moved between an open position where it is set aside from the first mold segment and a closed position where it bears against the first mold segment, and wherein loading of a mold is in the open position, wherein loading is possibly manually performed.

7. A method of using an injection molding module for performing injection molding comprising the steps of:
providing an injection molding module comprising an articulated robotic system and an injection molding unit coupled to the articulated robotic system,
moving at least portions of the articulated robotic system towards locations where injection over molding actions are planned to take place, and
using a series of anchoring members for anchoring a portion adjacent the injection molding unit and/or a last manipulator of the articulated robotic system adjacent at least some of the locations where injection molding takes place by entering the robotic system into mating engagement with a respective one of the series of anchoring members, wherein anchoring is at least momentarily at each such location, and wherein
the robotic system comprises an intake member for receiving material for injection molding and after receiving material the robotic system maintains the same orientation relative to a ground face for a duration of time before performing an injection molding action, and wherein
an orientation relative to the ground face of the robotic system when receiving material is different to the orientation relative to the ground face when performing at least some of the injection molding actions.

8. The method of claim 7, wherein the robotic system comprises a robot and an injection molding unit coupled to the robot, and wherein the robot is an articulated robot and the injection molding unit is coupled to a last manipulator of the robot.

9. The method of claim 7 and comprising at least one first work station comprising a plurality of injection sites where different injection molding actions are arranged to take place, and wherein each injection site comprises a mold.

10. The method of claim 9 and comprising at least one second work station comprising a plurality of injection sites where different injection molding actions are arranged to take place.

11. The method of claim 7, wherein the robotic system receives a dose of material prior to at least some molding actions, and wherein the dose of material generally corresponds to the amount of material required for the injection molding action about to take place.

12. The method of claim 7, wherein the duration of time that the robotic system maintains the same orientation relative to a ground face generally corresponds to a time span that it takes the material received in the robotic system to be ready for injection, and wherein anchoring is during injection molding.

13. The method of claim 7 and comprising a step of receiving molding parameters pertaining to molding action about to take place, wherein the molding parameters comprise at least one of: plasticizing/dosing end point (mm), Screw RPM (rev/min), Back pressure (bar), Suck back stroke (mm), Injection speed (mm/sec), V/P change over point (mm), Packing/holding pressure (bar), Packing/holding time (sec) and/or Cooling time (sec).

14. A method of using an injection molding module for performing injection over molding over pre-formed structural members, the method comprising the steps of:
providing an injection molding module comprising an articulated robotic system and an injection molding unit coupled to the articulated robotic system,
moving at least portions of the robotic system towards different injection sites each comprising a distinct mold where injection molding actions are planned to take place,
pre loading into each mold at least one pre-formed structural member, and
performing each over molding action over the at least one pre-formed structural member according to molding parameters pertaining to the over molding action about to take place, wherein at least some of the over molding actions are of over-molded inserts with different size projection surfaces upon respective structural members, and wherein performing each over molding action comprises, using a series of anchoring members, anchoring the robotic system adjacent the mold where the over molding action is about to take place by entering a portion adjacent the injection molding unit and/or a last manipulator the articulated robotic system into mating engagement with a respective one of the series of anchoring members.

15. The method of claim 14, wherein projection surfaces upon respective structural members are at least about 40 cm$^2$ in size.

16. The method of claim 14, wherein projection surfaces upon respective structural members are in magnitude of tens of square centimeters in size, and wherein in cavity pressures within molds during injection over molding actions are between about 300 and about 800 ATM.

17. The method of claim 14, wherein molding parameters comprises dose of material required for an injection molding action about to take place.

18. The method of claim 14 and comprising a step of receiving a dose of material at the robotic system, wherein possibly thereafter the robotic system maintains the same orientation relative to a ground face for a duration of time before performing an injection molding action, and wherein the duration of time generally corresponds to a time span that it takes the dose of material received in the robotic system to be ready for injection.

19. The method of claim 14 wherein molding parameters comprises comprise at least one of: plasticizing/dosing end point (mm), Screw RPM (rev/min), Back pressure (bar), Suck back stroke (mm), Injection speed (mm/sec), V/P change over point (mm), Packing/holding pressure (bar), Packing/holding time (sec) and/or Cooling time (sec).

* * * * *